United States Patent
Cathier et al.

(10) Patent No.: US 7,684,602 B2
(45) Date of Patent: Mar. 23, 2010

(54) METHOD AND SYSTEM FOR LOCAL VISUALIZATION FOR TUBULAR STRUCTURES

(75) Inventors: Pascal Cathier, Bures (FR); Jonathan Stoeckel, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1185 days.

(21) Appl. No.: 11/103,091

(22) Filed: Apr. 11, 2005

(65) Prior Publication Data

US 2006/0104495 A1 May 18, 2006

Related U.S. Application Data (60) Provisional application No. 60/628,985, filed on Nov. 18, 2004, provisional application No. 60/630,760, filed on Nov. 24, 2004.

(51) Int. Cl.
*G06K 9/00* (2006.01)

(52) U.S. Cl. .................. 382/131; 382/128; 382/154; 600/407; 600/473

(58) Field of Classification Search .......... 382/128, 382/133, 197, 260, 205, 131; 600/407, 473
See application file for complete search history.

(56) References Cited

U.S. PATENT DOCUMENTS

| | | | | |
|---|---|---|---|---|
| 5,987,094 | A * | 11/1999 | Clarke et al. ............ | 378/62 |
| 6,246,784 | B1 * | 6/2001 | Summers et al. ......... | 382/128 |
| 6,430,315 | B1 * | 8/2002 | Makram-Ebeid ......... | 382/197 |
| 6,526,305 | B1 * | 2/2003 | Mori ...................... | 600/410 |
| 6,609,021 | B1 * | 8/2003 | Fan et al. ................. | 600/425 |
| 6,842,638 | B1 * | 1/2005 | Suri et al. ................ | 600/425 |
| 7,274,810 | B2 * | 9/2007 | Reeves et al. ............ | 382/128 |
| 7,295,870 | B2 * | 11/2007 | Allain et al. ............. | 600/425 |
| 2003/0053697 | A1 * | 3/2003 | Aylward et al. ......... | 382/203 |
| 2003/0197704 | A1 * | 10/2003 | Tek et al. ................. | 345/474 |

(Continued)

FOREIGN PATENT DOCUMENTS

WO    WO 02/93932 A1 *    1/2001

(Continued)

OTHER PUBLICATIONS

Abdessamad Ben Hamza "Geometric and Topological Variational Methods for Imaging and Computer Vision",a dissertation submitted to the graduate faculty of North Carolina state university in partial fulfillment of the requirements for the degree of doctor of philosophy, department of electrical and computer engineering, published on Oct. 28,20.*

(Continued)

*Primary Examiner*—Brian Q Le
*Assistant Examiner*—Mekonen Bekele (57) ABSTRACT

A method of visualizing an object in an image includes presenting an image, selecting a point in an object of interest in said image, estimating a gradient of the image in a region about the selected point, calculating a structure tensor from the image gradient, analyzing said structure tensor to determine a main orientation of said object of interest, and presenting a visualization of said object of interest based on the main orientation of the object. Various techniques can be used to increase the robustness of the gradient estimation with respect to noise, and to enhance the visualization of the object-of-interest presented to a user.

27 Claims, 4 Drawing Sheets

U.S. PATENT DOCUMENTS

| | | | |
|---|---|---|---|
| 2003/0197740 A1* | 10/2003 | Reponen | 345/810 |
| 2004/0024302 A1* | 2/2004 | Chalana et al. | 600/407 |
| 2004/0076313 A1* | 4/2004 | Bronstein et al. | 382/118 |
| 2004/0101184 A1* | 5/2004 | Sivaramakrishna et al. | 382/131 |
| 2004/0252870 A1* | 12/2004 | Reeves et al. | 382/128 |
| 2006/0039590 A1* | 2/2006 | Lachine et al. | 382/128 |
| 2006/0083418 A1* | 4/2006 | Watson et al. | 382/133 |

FOREIGN PATENT DOCUMENTS

| | | |
|---|---|---|
| WO | WO 2005/031649 A1 | 4/2005 |

OTHER PUBLICATIONS

David P. Dobkin et al. [hereafter Dobkin] "Searching for Empty Convex Polygons" 1990 Springer-Verlag New York Inc, p. 561-571.*

Pavel Matula "Effectivity of Spherical Object Reconstruction Using Star-Shaped Simplex Meshes" Proceedings of the First International Symposium on 3D Data Processing Visualization and Transmission (3DPVT.02) © 2002 IEEE , p. 1-6.*

K. Krissian et al., "Multiscale Segmentation of the Aorta in 3D Ultrasound Image", 2003 IEEE, published Sep. 17, 2003, p. 638-641.*

Paul L. Rosin, Edge saliency measure and automatic thresholding, Machine vision and application, vol. 9p. 139-159, published on 1997.*

Devernay, "A Non-Maxima Suppression Method for Edge Detection with Sub-Pixel Accuracy", published on Nov. 1995.*

Ben Hamza (hereafter Hamza), "Geometric and Topological Variational Methods for Imaging and Computer Vision", published on Oct. 28, 2003.*

"Multiscale segmentation of the aorta in 30 ultrasound images", Krissian et al., Proceedings of the 25$^{th}$ Annual International Conference of the IEEE Engineering in Medicine and Biology Society, Cancun, Mexico, Sep. 17, 2003, vol. 4 of 4, Conf. 25, pp. 638-641.

"Edges: saliency measures and automatic thresholding", Rosin et al., Machine Vision and Applications, Springer Verlag, DE, vol. 9, No. 4, 1997, pp. 139-159.

"Visualization of noisy and biased volume data using first and second order derivative techniques", Persoon et al., IEEE Visualization 2003, Proceedings, Seattle, WA, Oct. 19-24, 2003, pp. 379-385.

"A Non-Maxima Suppression Method for Edge Detection with Sub-Pixel Accuracy", Devernay, Institut National de Recherche En Informatique Et En Automatique, Nov. 1995, retrieved from the internet: http://users.utcluj.ro/~rdanescu/Projects/P11_RR-2724.

International Search Report including Notification of Transmittal of the International Search Report, International Search Report and Written Opinion of the International Searching Authority, PCT Appln. No. PCT/US2005/014728, mailed Aug. 21, 2006.

* cited by examiner

METHOD AND SYSTEM FOR LOCAL VISUALIZATION FOR TUBULAR STRUCTURES

CROSS REFERENCE TO RELATED UNITED STATES APPLICATIONS

This application claims priority from "LOCAL VISUALIZATION TECHNIQUES FOR VESSEL STRUCTURES", U.S. Provisional Application No. 60/628,985 of Cathier, et al., filed Nov. 18, 2004, the contents of which are incorporated herein by reference, and "ADVANCED INTERACTIVE VISUALIZATION OF LOCALLY ORIENTED STRUCTURES", U.S. Provisional Application No. 60/630,760 of Cathier, et al., filed Nov. 24, 2004, the contents of which are incorporated herein by reference.

TECHNICAL FIELD

This invention is directed to visualizing vascular and other tubular structures in a digital medical image.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels. Computer-aided diagnosis ("CAD") systems play a critical role in the analysis and visualization of digital imaging data.

An important application of computed tomographic (CT) imaging systems, as well as magnetic resonance (MR) imaging and 3-D x-ray (XR) imaging systems, is to produce 3D image data sets for vascular analysis, which can include analysis of a variety of tortuous tubular structures such as airways, ducts, nerves, blood vessels, etc. Production of such 3D image data sets is particularly important for radiologists, who are called upon to provide thorough visual reports to allow assessments of stenosis or aneurysm parameters, quantify lengths, section sizes, angles, and related parameters. Information concerning, for example, the most acute stenosis on a selected vessel section, the largest aneurysm on a selected vessel section, or the tortuosity of a vessel, is commonly utilized by physicians to allow for surgical planning. For productivity reasons, as well as to reduce film costs, the 3D image data sets should be limited to only a small set of significant images.

To facilitate the obtaining of useful information for vascular analysis in an efficient manner, conventional medical imaging systems sometimes provide 3D visualization software. Such software is provided either on the imaging systems themselves or on analysis workstations, and provides a set of tools to perform length, angle or volume measurements and to visualize a volume in different ways, for example, using cross-sections, navigator or volume rendering. With respect to vascular analysis, in particular, the software can be used to obtain multiple oblique slices of a particular vessel to allow for analysis of the vessel.

Analyzing tortuous structures, such as airways, vessels, ducts or nerves is one of the major applications of medical imaging systems. This task is accomplished today by using multiple oblique slices to analyze local segments of these structures. These views provide a clear, undistorted picture of short sections from these objects but rarely encompass their full length. Curved reformation images provide synthetic views that capture the whole length of these tubular objects and are therefore well suited to this analysis task. True 3D length measurements along the axis can be obtained from these views and they are not too far from the real anatomy in many cases. Curved reformation images can be generated by sampling values along a curve at equidistant points to generate lines, and then translating this curve by a sampling vector to generate the next image line.

Therefore, new methods and apparatuses for allowing medical imaging systems and related 3D visualization software to produce useful 3D imaging data sets in a more efficient, consistent, repeatable, rapid, and less operator-dependent manner, would be useful. New methods and apparatuses that facilitated vascular analysis, including the analysis and imaging of tubular vessels and related stenoses, aneurysms, and tortuosity, would also be useful. It further would be helpful if such methods and apparatuses could be employed both during imaging and in post-processing after imaging is completed.

SUMMARY OF THE INVENTION

Exemplary embodiments of the invention as described herein generally include methods and systems for local visualization of vessel structures and other tubular-like structures. The techniques herein disclosed are improvements upon the techniques disclosed in U.S. patent applicant Ser. No. 10/945,022, "METHOD AND SYSTEM FOR AUTOMATIC ORIENTATION OF LOCAL VISUALIZATION TECHNIQUES FOR VESSEL STRUCTURES", filed Sep. 20, 2004, the contents of which are herein incorporated by reference in their entirety. The embodiments herein disclosed can be used for many different applications, including, but not limited to, differentiation between nodules and vessels, for example for analyzing CAD marks of possible nodules; analysis of pulmonary emboli; analysis of other vascular trees, for example to detect an aneurysm; analysis of bronchi; and analysis of bones, such as the spine.

According to an aspect of the invention, there is provided a method of visualizing a tubular object in an image including presenting an image with a plurality of intensities corresponding to a domain of points in a D-dimensional space, selecting a point in a object of interest in the image, estimating a gradient of the image in a region about the selected point, calculating a structure tensor from the image gradient, analyzing the structure tensor to determine a main orientation of the object of interest, and presenting a visualization of the object of interest based on the main orientation of the object of interest.

According to a further aspect of the image, estimating the gradient includes removing those gradients whose magnitude is less than a threshold.

According to a further aspect of the image, the threshold is determined from a statistical distribution of gradient magnitudes in the region about the selected point.

According to a further aspect of the image, estimating the gradient comprises resealing the gradient according to the formula gradient=gradient*$f$(|gradient|)/|gradient|, wherein f(x) is a sigmoid shaped function that approaches zero as x→0 and is non-zero and bounded as x→+∞.

According to a further aspect of the image, estimating the gradient comprises suppressing non-maximal gradients to retain only those gradients on an object boundary.

According to a further aspect of the image, estimating the gradient comprises using only those gradients that either lie in or near a connected component containing the selected point.

According to a further aspect of the image, estimating the gradient comprises using only those gradients that either lie in or near a maximal star-convex subset of the image that has the selected point as a center.

According to a further aspect of the image, the method further comprises using only those gradients that either lie in or near a dilated maximal star-convex subset of the image that has the selected point as a center.

According to a further aspect of the image, estimating the gradient comprises using a weighting function in the structure tensor computation that depends on a geodesic distance between points in the object of interest, wherein the geodesic distance is measured within the object of interest.

According to a further aspect of the image, presenting a visualization of the object of interest comprises presenting one or more parallel images about the selected point that are perpendicular about the main orientation of the object of interest.

According to a further aspect of the image, presenting a visualization of the object of interest comprises presenting one or more images of slices that contain the main orientation of the object, wherein the slices are rotated about the axis with respect to each other.

According to a further aspect of the image, presenting a visualization of the object of interest comprises presenting a plurality of images, each image being rotated at a different orientation about an image coordinate axis, and further comprising indicating an image that best displays a tubular structure.

According to a further aspect of the image, analyzing the structure tensor comprises calculating the eigenvectors and eigenvalues of the structure tensor, and further comprising measuring ratios of the eigenvalues to determine whether the selected point is contained in a tubular structure.

According to another aspect of the invention, there is provided a program storage device readable by a computer, tangibly embodying a program of instructions executable by the computer to perform the method steps for visualizing a tubular object in an image

DETAILED DESCRIPTION OF THE PREFERRED EMBODIMENTS

Exemplary embodiments of the invention as described herein generally include systems and methods for local visualization of vessel structures.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Vascular structures are examples of tubular-shaped objects, which are commonly found in medical images. Other examples of tubular objects in medical images can include vessels, bronchi, bowels, ducts, nerves and specific bones. Representation and analysis of tubular objects in medical images can aid medical personnel in understanding the complex anatomy of a patient and facilitate medical treatments. When reviewing 3D images of vascular structures such as CT scans, a physician can use axial slices to detect any abnormal structures (e.g. nodules or emboli), but to further analyze the shape of the structure, additional views are useful. One possibility is the cartwheel projection, where the projection plane is turned around an axis. It makes it easier for a physician to assess whether a structure is round or not. Another possibility is to analyze projection planes orthogonal to the vessel axis. These techniques require an axis as an input. This axis should preferably be the axis of the vessel. Taking an arbitrary axis by default can sometimes yield bad visualization results.

In a typical analysis situation, a physician reviews a volumetric image, such as a CT image of the lungs, looking for spherical structures. The images are huge in all three dimensions. Usually the physician only looks at axial images, i.e. X-Y slices of the volume, one at a time, usually starting from the head down, and back. The slices are typically 512×512 pixels, while the structures the physician is looking at are typically a few pixels wide. So, while the physician can easily dismiss most of the image, sometimes he or she may want to have a closer look at a structure. What's more, when having a closer look, he or she may want to have full 3D information, instead of just the X-Y cut.

According to an embodiment of the invention, the structure tensor can be used to detect the principal local orientation of a vessel structure. The structure tensor can be calculated as the gradient of the image, as disclosed in U.S. patent applicant Ser. No. 10/945,022. As disclosed therein, the structure tensor is a 3×3 matrix that can be derived by convolving the outer product of the image gradient with its transpose with a spatial filter whose size corresponds to an object being sought:

$$T = G_\sigma * \nabla I . \nabla I^T,$$

where the gradient of the image is a 3D vector formed of the image partial derivatives along the canonical axes:

$$\nabla I = \left[ \frac{\partial I}{\partial x}, \frac{\partial I}{\partial y}, \frac{\partial I}{\partial z} \right]^T,$$

and $G_\sigma$ is a spatial filter in the form of a Gaussian kernel:

$$G_\sigma(x) = \frac{1}{\left(\sqrt{2\pi}\,\sigma\right)^D} \exp\left(-\frac{x^2}{2\sigma^2}\right).$$

Figure 5:
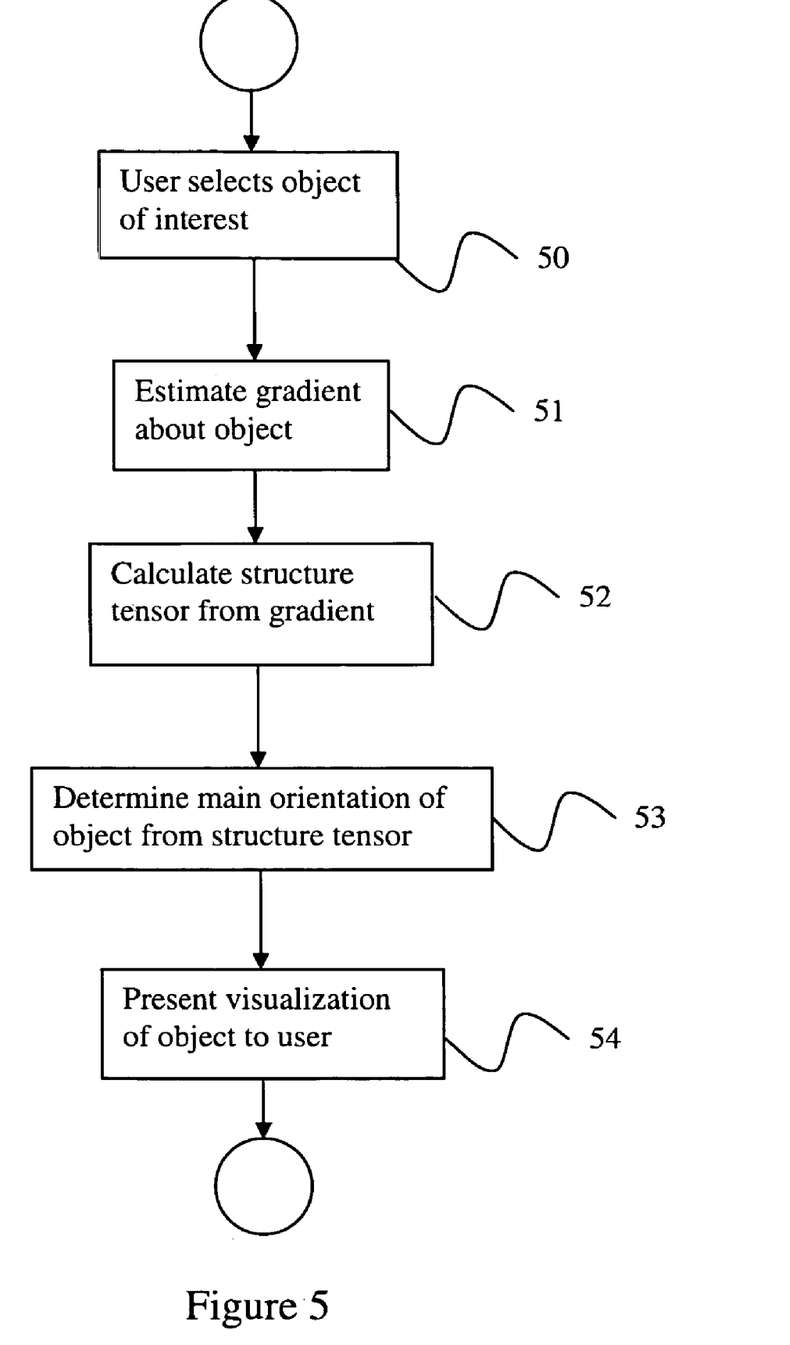
FIG. 5 is a flow chart of a method for local visualization of a vessel structure, according to an embodiment of the invention.

FIG. 5 presents a flow chart of a method for local visualization of a vessel structure, according to an embodiment of the invention. A user, such as a physician or a medical technician, is presented with an image generated by a modality such as CT or MRI, as are known in the art. The image can be presented on the monitor of a computer system adapted to process and display digital medical images. At step 50, the user selects an object of interest in the image. The selection can be performed, for example, by the user clicking on the object of interest with a computer mouse or other input device. At step 51, the gradient of the image is calculated over the region of the image about the point selected by the user. At step 52, the structure tensor is computed from the gradient, and the structure is analyzed at step 53 to determine the main orientation of the object of interest. At step 54, the visualization of the object of interest is presented to the user on a computer monitor.

It is known that the gradient, estimated at step 51, can be noise-sensitive. Therefore, to increase the robustness of the local orientation estimation, one can increase the robustness of the gradient estimation.

According to an embodiment of the invention, a gradient estimation can be made more robust through thresholding. A gradient whose magnitude is smaller than some threshold is removed. A threshold can be fixed, or it can be computed on the fly, for example, by using quantiles or by examining the statistical distribution of gradient magnitudes.

According to an embodiment of the invention, a gradient estimation can be made more robust through magnitude modification. In this embodiment, the magnitude of a gradient can be rescaled by a function f according to the formula $$\mathrm{grad} = \mathrm{grad} * f(|\mathrm{grad}|)/|\mathrm{grad}|.$$

According to an embodiment of the invention, f(x) would have a sigmoid shape, going to zero as x→0, playing a similar role as the thresholding above, and also being non-zero and bounded as x→+∞, to avoid being sensitive to high-contrast artifacts. One exemplary, non-limiting sigmoid rescaling function is $$f(x) = \frac{1}{1 + \exp(-(x-a))},$$

where the function can be shifted along the x-axis by varying the value of α. An exemplary, non-limiting value is α=10. Another exemplary rescaling function is $$f(x) = \frac{\tan^{-1}(x+a) + \pi/2}{\pi}.$$

These examples of rescaling functions are non-limiting, and any function having the general shape as described above can be used as a rescaling function.

According to an embodiment of the invention, a gradient estimation can be made more robust by non-maxima suppression. Since image object boundaries exhibit large intensity discontinuities, a gradient on an object boundary is typically greater in magnitude than a gradient not on an object boundary. Small-magnitude gradients due to noise or the texture of the object or background should be ignored. In this embodiment, a gradient is kept only on an estimated object boundary, thus suppressing non-maximal gradient. An object boundary can be detected through segmentation, and methods for segmentation are known in the art of image analysis. Another method for detecting an object boundary that does not involve segmentation is the Canny edge detector algorithm (see e.g. http://www.cee.hw.ac.uk/hipr/html/canny.html).

According to an embodiment of the invention, a gradient estimation can be made more robust by using a gradient that lie only in or in the vicinity of a connected component to which a user's mouse click point belongs. A connected component can be detected by the same methods used for detecting objects and object boundaries, such as segmentation or the Canny edge detector algorithm. However, in this embodiment, the gradient is used at all the points in the object, and points within a certain distance of the object. Limiting the gradients to those near or in the connected component avoids taking into account the orientation of objects other than the object that has been selected by a user for visualization.

Figure 1:
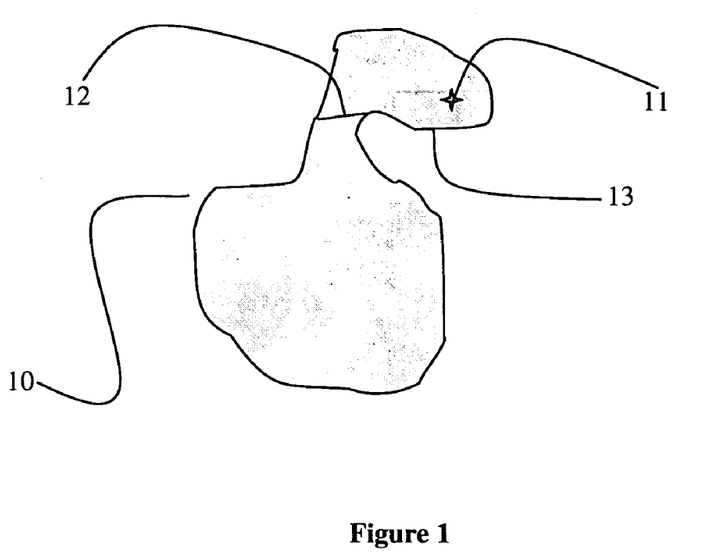
FIG. 1 depicts a star-convex subset of an object, according to an embodiment of the invention.

According to an embodiment of the invention, a gradient estimation can be made more robust by using a gradient that lies only in or in the vicinity of the maximal star-convex subset of the image, with the click-point at its center. This avoids taking into account the orientation of other objects or even other parts of the same object. A star-convex subset S with center x of a set O is such that for every point y of S, the straight line segment going from x to y belongs to S. The maximal star-convex subset of O with center x is the union of all star-convex subsets of O with center x, and is also star-convex. An example of a 2D maximal star-convex set is a circle with a center within the circle, because from the center point x one can draw straight lines to every point on the border of the circle without ever crossing the boundaries of the circle. An example of a star-convex subset of an arbitrary object is depicted in FIG. 1, where the point x 11 is indicated by a star, and the star convex subset 13 is the upper part of this object 10 as cut of by the black line 12. In another variation of this embodiment, the star-convex assumption can be relaxed by the use of a dilation, inside the object, of the maximal star-convex subset. In general, dilating an object makes the object larger. Dilating the maximal star-convex subset is equivalent to tracing, outside of the border of the maximal star-convex subset, a thick round marker around the maximal star-convex subset.

Figure 2:
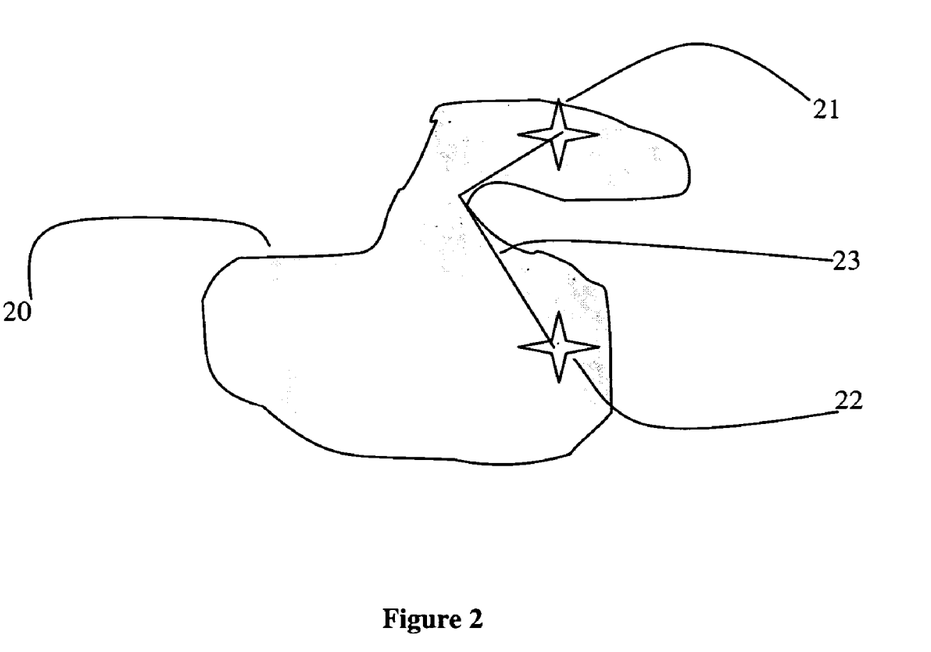
FIG. 2 illustrates the geodesic distance between two points in an object of interest, according to an embodiment of the invention.

According to an embodiment of the invention, a gradient estimation can be made more robust by using a weighting function for the computation of the structure tensor that does not depend on the Euclidean distance to the click-point, but to a geodesic distance. In this context, a geodesic distance is the distance between point A and point B in the object as measured by going from A to B without ever going outside the object. For example, referring to FIG. 2, an object 20 contains points 21, 22. The geodesic distance between these points is indicates by the line 23. Note that a strait line between points 21 and 22 would go outside the object 20. An exemplary weighting function is the Gaussian kernel $G_\sigma$ defined above:

$$G_\sigma(x) = \frac{1}{\left(\sqrt{2\pi}\,\sigma\right)^D} \exp\left(-\frac{x^2}{2\sigma^2}\right).$$

According to this embodiment of the invention, the argument x would represent a geodesic distance, not a strait-line Euclidean distance.

According to another embodiment of the invention, two or more of the gradient estimation methods disclosed above can be combined in sequence to further enhance the robustness of the estimation.

According to another embodiment of the invention, other image processing methods as are known in the art, such as analysis of the Hessian matrix, vessel tree segmentation, steerable filters, etc. can be used to estimate the main orientation of the object.

Figure 3:
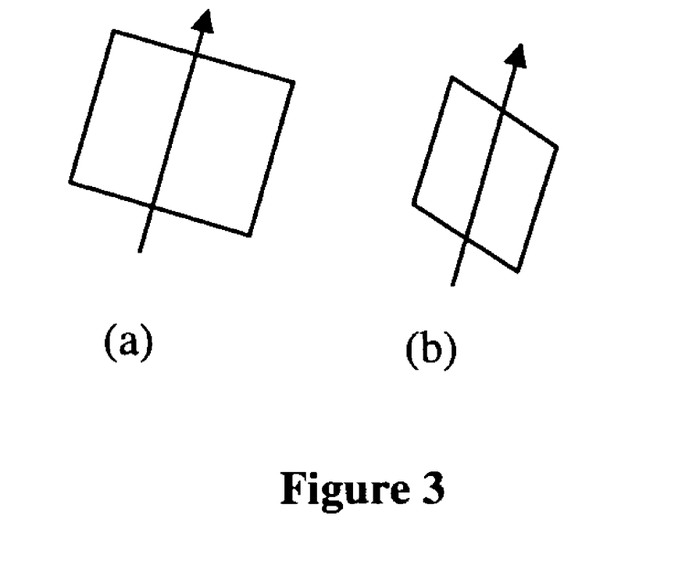
FIG. 3 depicts how images containing the main axis of an object of interest can be presented at different angles to a user, according to an embodiment of the invention.

Referring back to FIG. 5, once a main orientation of a tubular structure has been determined at step 53, it can be used to help a user visualize the tubular structure at step 54. According to an embodiment of the invention, one or more parallel images that are perpendicular to the main orientation direction around the point used for orientation calculation can be generated from the full image volume and shown to a user. This type of presentation can be used to simulate the process of a user moving in and out of the visualized object. Alternatively, according to another embodiment of the invention, slices can be generated that contain the main orientation axis but which are rotated at different angles with respect to each other, or parallel to each other, and shown to a user, as illustrated in FIG. 3. Referring now to the figure, two planes (a) and (b) are depicted at different rotation angles around a main orientation axis, indicated by the arrow. More than one slice can be present simultaneously to a user, who could use a mouse or slider to easily change the angle of a particular slice.

Figure 4:
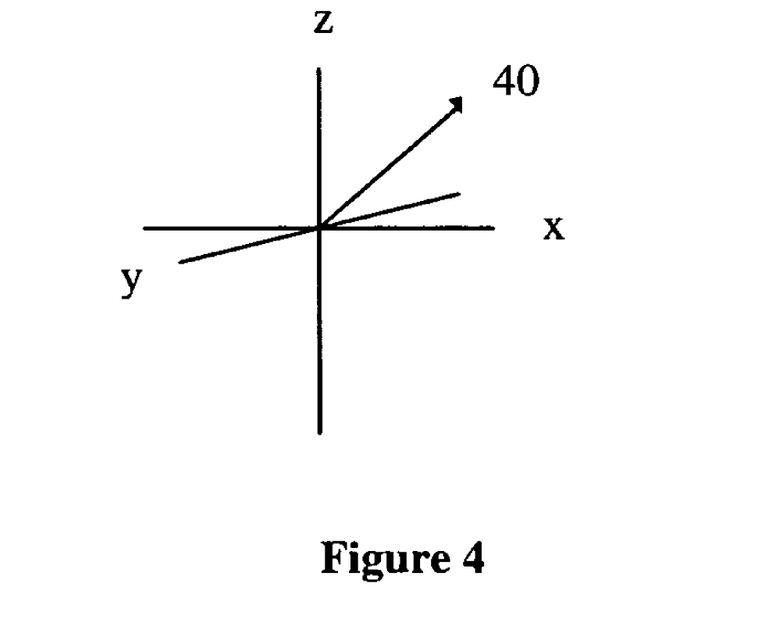
FIG. 4 depicts a main orientation axis for a tubular object in an x-y-z coordinate system, according to an embodiment of the invention.

According to an embodiment of the invention, rotating images, such as those generated by a cartwheel projection or a rotating multi-planar reconstruction, can be generated around one of the main axes of the image coordinate system. FIG. 4 depicts a main orientation axis 40 for a tubular object in an x-y-z coordinate system. Referring to the figure, and assuming for expository purposes that a fixed axis of rotation is the x axis, there will always be exactly one plane among the planes rotated about the x-axis such that the main orientation vector 40 of the tubular structure lies exactly in that plane. This plane can be marked as providing the best view of the tubular structure. This can be useful to use standard rotating around one of the main axes that gives the user an easier way of orientating himself while quickly finding an eventual tubular structure (e.g. vessel versus nodule).

According to an embodiment of the invention, once a structure has been visualized, a user could again interact with the images generated to select a new point to calculate a main orientation. A new image can be generated based on that point and it's main orientation according to the embodiments of the invention previously disclosed, and this new image can be shown to the user. In this way a user can track a tubular structure, such as a vessel or bronchi. According to another embodiment of the invention, the system can automatically determine a new point and, either automatically or on request by the user, show one or more images based on the main orientation calculated for that point. This automatic/manual approach of selecting as point and presenting one or more images based on the main orientation can be repeated.

According to an embodiment of the invention, ratios of the eigenvalues of the structure tensor can be used to determine the confidence if the point is part of a tubular structure. For example, denoting the eigenvalues as $(e_1, e_2, e_3)$, a spherical structure would be characterized by $e_1=e_2=e_3$, so the ratio of any pair of eigenvalues should be one. A structure that is approximately spherical would have eigenvalue ratios approximately equal to one. Assuming the eigenvalues to be sorted by size, a tubular object would be characterized by $e_1=e_2>>e_3$, and a planar structure would be characterized by $e_1>>e_2=e_3$. This information can be used to automatically decide on which of the previously disclosed visualization methods according to the embodiments of the invention is most appropriate for the user. According to another embodiment of the invention, a warning could also be presented to the user that assumptions made by such visualization techniques (i.e. that the structure at hand is indeed oriented) are violated.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
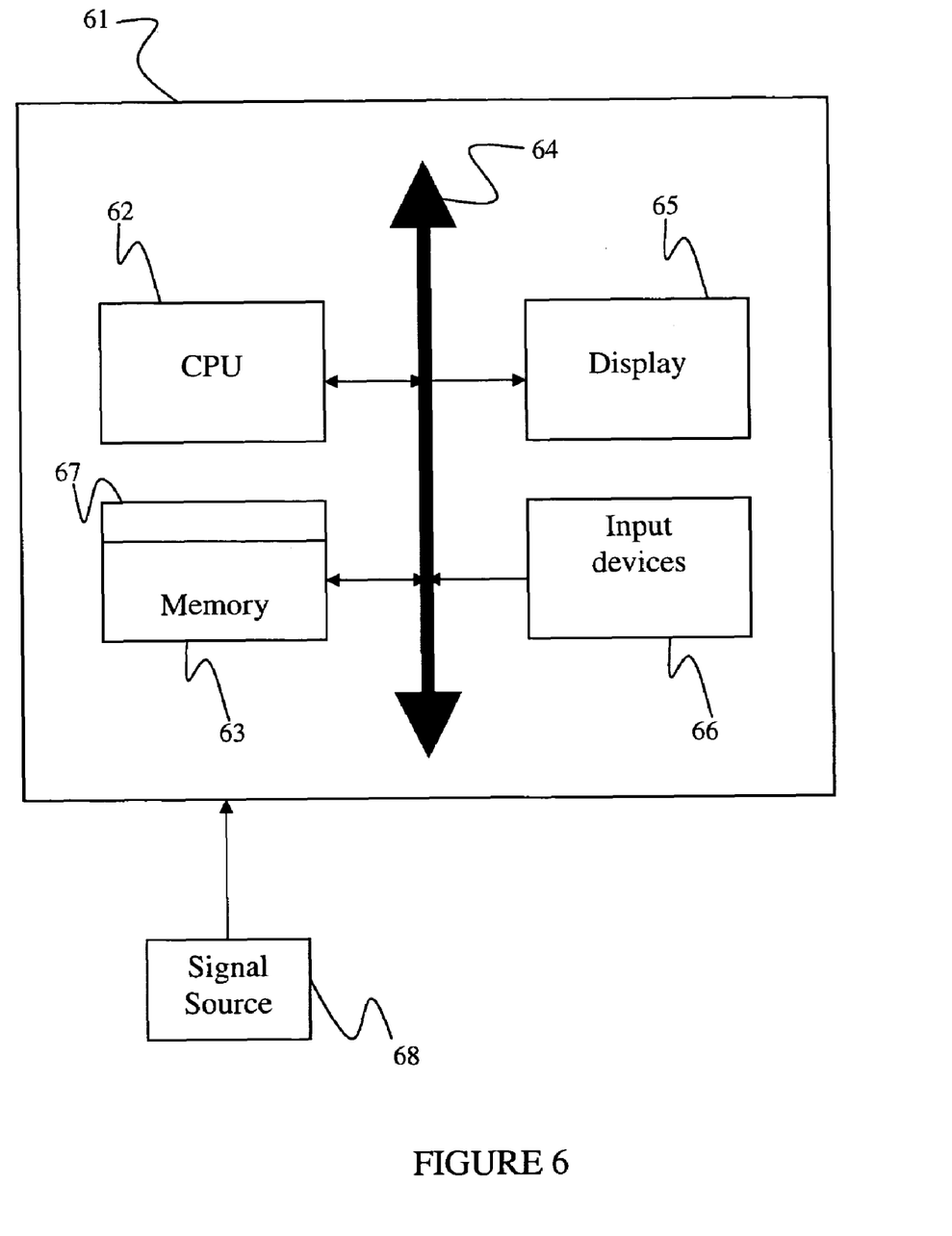
FIG. 6 is a block diagram of an exemplary computer system for implementing a local visualization system, according to an embodiment of the invention.

Referring now to FIG. 6, according to an embodiment of the present invention, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for a computer processor to visualize a tubular object in a digital medical image, said method performed by said processor comprising the steps of:
   presenting an image with a plurality of intensities corresponding to a domain of points in a D-dimensional space;
   selecting a point in a object of interest in said image;
   estimating a gradient of the image in a region about the selected point, wherein estimating said gradient comprises using only those gradients that either lie in or near a maximal star-convex subset of the image that has the selected point as a center;
   calculating a structure tensor from the image gradient;
   analyzing said structure tensor to determine a main orientation of said object of interest; and
   presenting a visualization of said object of interest based on said main orientation of said object of interest,
   wherein said steps of presenting an image, selecting a point, estimating a gradient, calculating a structure tensor, analyzing said structure tensor, and presenting a visualization are performed by a computer processor.

2. The method of claim 1, wherein estimating said gradient comprises removing those gradients whose magnitude is less than a threshold.

3. The method of claim 2, wherein said threshold is determined from a statistical distribution of gradient magnitudes in the region about the selected point.

4. The method of claim 1, wherein estimating said gradient comprises rescaling said gradient according to the formula gradient=gradient*$f(|\text{gradient}|)/|\text{gradient}|$, wherein f(x) is a sigmoid shaped function that approaches zero as x→0 and is non-zero and bounded as x→+∞.

5. The method of claim 1, wherein estimating said gradient comprises suppressing non-maximal gradients to retain only those gradients on an object boundary.

6. The method of claim 1, wherein estimating said gradient comprises using only those gradients that either lie in or near a connected component containing said selected point.

7. The method of claim 1, further comprising using only those gradients that either lie in or near a dilated maximal star-convex subset of the image that has the selected point as a center.

8. The method of claim 1, wherein estimating said gradient comprises using a weighting function in the structure tensor computation that depends on a geodesic distance between points in the object of interest, wherein said geodesic distance is measured within the object of interest.

9. The method of claim 1, wherein presenting a visualization of said object of interest comprises presenting one or more parallel images about the selected point that are perpendicular about said main orientation of said object of interest.

10. The method of claim 1, wherein presenting a visualization of said object of interest comprises presenting one or more images of slices that contain the main orientation of said object, wherein said slices are rotated about said axis with respect to each other.

11. The method of claim 1, wherein presenting a visualization of said object of interest comprises presenting a plurality of images, each image being rotated at a different orientation about an image coordinate axis, and further comprising indicating an image that best displays a tubular structure.

12. The method of claim 1, wherein analyzing said structure tensor comprises calculating the eigenvectors and eigenvalues of said structure tensor, and further comprising measuring ratios of said eigenvalues to determine whether said selected point is contained in a tubular structure.

13. A method for a computer processor to visualize an object in a digital medical image, said method performed by said processor comprising the steps of:
   presenting an image with a plurality of intensities corresponding to a domain of points in a D-dimensional space;
   selecting a point in an object of interest in said image;
   determining a main orientation of said object of interest based on said selected point; and
   visualizing said object of interest based on said main orientation of said object of interest, wherein visualizing includes presenting one or more parallel images about the selected point that are perpendicular to said main orientation of said object of interest, and presenting one or more images of slices containing said main orientation of said object, wherein said slices are rotated about said axis with respect to each other,
   wherein said steps of presenting an image, selecting a point, determining a main orientation, and visualizing said object of interest are performed by a computer processor.

14. The method of claim 13, wherein visualizing said object of interest comprises presenting a plurality of images, each image being rotated at a different orientation about an image coordinate axis, and further comprising indicating an image that best displays a tubular structure.

15. The method of claim 13, wherein determining main orientation of said object of interest comprises one or more of analyzing a Hessian matrix calculated about said selected point, vessel tree segmentation, and utilizing a steerable filter.

16. A program storage device readable by a computer, tangibly embodying a program of instructions executable by the computer to perform the method steps for visualizing a tubular object in an image, said method comprising the steps of:
   presenting an image with a plurality of intensities corresponding to a domain of points in a D-dimensional space;
   selecting a point in a object of interest in said image;
   estimating a gradient of the image in a region about the selected point, wherein estimating said gradient comprises rescaling said gradient according to the formula gradient=gradient*$f(|\text{gradient}|)/|\text{gradient}|$, wherein f(x) is a sigmoid shaped function that approaches zero as x→0 and is non-zero and bounded as x→+∞;
   calculating a structure tensor from the image gradient;

analyzing said structure tensor to determine a main orientation of said object of interest; and presenting a visualization of said object of interest based on said main orientation of said object of interest.

17. The computer readable program storage device of claim 16, wherein estimating said gradient comprises removing those gradients whose magnitude is less than a threshold.

18. The computer readable program storage device of claim 17, wherein said threshold is determined from a statistical distribution of gradient magnitudes in the region about the selected point.

19. The computer readable program storage device of claim 16, wherein estimating said gradient comprises suppressing non-maximal gradients to retain only those gradients on an object boundary.

20. The computer readable program storage device of claim 16, wherein estimating said gradient comprises using only those gradients that either lie in or near a connected component containing said selected point.

21. The computer readable program storage device of claim 16, wherein estimating said gradient comprises using only those gradients that either lie in or near a maximal star-convex subset of the image that has the selected point as a center.

22. The computer readable program storage device of claim 21, further comprising using only those gradients that either lie in or near a dilated maximal star-convex subset of the image that has the selected point as a center.

23. The computer readable program storage device of claim 16, wherein estimating said gradient comprises using a weighting function in the structure tensor computation that depends on a geodesic distance between points in the object of interest, wherein said geodesic distance is measured within the object of interest.

24. The computer readable program storage device of claim 16, wherein presenting a visualization of said object of interest comprises presenting one or more parallel images about the selected point that are perpendicular about said main orientation of said object of interest.

25. The computer readable program storage device of claim 16, wherein presenting a visualization of said object of interest comprises presenting one or more images of slices that contain the main orientation of said object, wherein said slices are rotated about said axis with respect to each other.

26. The computer readable program storage device of claim 16, wherein presenting a visualization of said object of interest comprises presenting a plurality of images, each image being rotated at a different orientation about an image coordinate axis, and further comprising indicating an image that best displays a tubular structure.

27. The computer readable program storage device of claim 16, wherein analyzing said structure tensor comprises calculating the eigenvectors and eigenvalues of said structure tensor, and further comprising measuring ratios of said eigenvalues to determine whether said selected point is contained in a tubular structure.

* * * * *